United States Patent [19]
Kinugasa et al.

[11] Patent Number: 6,133,185
[45] Date of Patent: *Oct. 17, 2000

[54] EXHAUST GAS PURIFYING CATALYST

[75] Inventors: Yukio Kinugasa; Kouhei Igarashi, both of Susono; Takaaki Itou, Mishima; Naoto Suzuki, Susono; Takehisa Yaegashi, Mishima; Takaaki Kanazawa; Takahiro Hayashi, both of Toyota; Koji Yokota, Nagoya; Yasutaka Nagai, Aichi-gun, all of Japan

[73] Assignees: Toyota Jidosha Kabushiki Kaisha, Toyota; Kabushiki Kaisha Toyota Chuo Kenkyusho, Nagakute-cho, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,814

[22] Filed: Nov. 6, 1996

[30] Foreign Application Priority Data

| Nov. 9, 1995 | [JP] | Japan | 7-291258 |
| Nov. 20, 1995 | [JP] | Japan | 7-301530 |
| Dec. 8, 1995 | [JP] | Japan | 7-320299 |

[51] Int. Cl.$^7$ ................................. B01J 29/06
[52] U.S. Cl. ................. 502/67; 502/64; 502/66; 502/74
[58] Field of Search ............ 423/239.2; 502/64, 502/66, 67, 74

[56] References Cited

U.S. PATENT DOCUMENTS

| | | |
|---|---|---|
| 3,810,361 | 5/1974 | Weaving et al. . |
| 3,825,654 | 7/1974 | Kobylinski et al. . |
| 3,953,576 | 4/1976 | Meguerian et al. . |
| 4,321,792 | 3/1982 | Achard . |
| 4,393,031 | 7/1983 | Henke . |
| 4,395,875 | 8/1983 | Virk . |
| 5,207,058 | 5/1993 | Sasaki et al. . |
| 5,236,879 | 8/1993 | Inoue et al. ................. 502/73 |
| 5,292,696 | 3/1994 | Ito et al. ..................... 502/66 |
| 5,410,873 | 5/1995 | Tashiro . |
| 5,443,803 | 8/1995 | Mizuno et al. ............. 423/213.2 |
| 5,461,857 | 10/1995 | Itou et al. . |
| 5,479,775 | 1/1996 | Kraemer et al. . |
| 5,661,971 | 9/1997 | Waschatz et al. . |
| 5,740,669 | 4/1998 | Kinugasa et al. . |
| 5,746,052 | 5/1998 | Kinugasa et al. . |
| 5,782,087 | 7/1998 | Kinugasa et al. . |
| 5,783,160 | 7/1998 | Kinugasa et al. . |
| 5,825,425 | 10/1998 | Schastiano et al. . |

FOREIGN PATENT DOCUMENTS

97/17532  5/1997  WIPO .

OTHER PUBLICATIONS

Japanese Unexamined Patent Publication No. 4–3695920, Dec. 17, 1992.
Japanese Unexamined Patent Publication No. 1–310742, Dec. 14, 1989.
Japanese Unexamined Patent Publication No. 63–100919, May 6, 1988.
Japanese Unexamined Patent Publication No. 1–130735, May 23, 1989.
Japanese Unexamined Patent Publication No. 2–265622, Oct. 30, 1990.
Japanese Unexamined Patent Publication No. 4–22706, Jan. 27, 1992.
Japanese Unexamined Patent Publication No. 3–131344, Jun. 4, 1991.
Japanese Unexamined Patent Publication No. 3–86213, Apr. 11, 1991.
Japanese Unexamined Patent Publication No. 2–164451, Jun. 25, 1990.
Japanese Unexamined Patent Publication No. 50–66477, Jun. 4, 1975.

*Primary Examiner*—Tom Dunn
*Attorney, Agent, or Firm*—Kenyon & Kenyon

[57] ABSTRACT

An exhaust gas purifying catalyst, for reducing nitrogen oxides and ammonia in an exhaust gas of an internal combustion engine, in an oxidizing atmosphere, is provided. The exhaust gas purifying catalyst comprises a first catalyst having zeolite carrying platinum and copper thereon. Preferably, the exhaust gas purifying catalyst further comprises a second catalyst having zeolite carrying copper thereon. Preferably, the second catalyst is arranged upstream of the first catalyst, with respect to the exhaust gas flow.

5 Claims, 4 Drawing Sheets

···◇··· EXAMPLE 1
(Pt-Cu ZEORITE CATALYST)

--○-- EXAMPLE 2
(Cu ZEORITE CATALYST
+Pt-Cu ZEORITE CATALYST)

—□— COMPARATIVE EXAMPLE
(Cu ZEORITE CATALYST)

EXHAUST GAS PURIFYING CATALYST

BACKGROUND OF THE INVENTION

1. Field of the Invention

The present invention relates to an exhaust gas purifying catalyst.

2. Description of the Related Art

It has been known an exhaust gas purifying apparatus for an internal combustion engine with multi-cylinders, in which an engine air-fuel ratio is controlled to a stoichiometric point, wherein a three-way catalyst is arranged in an exhaust passage connected to each cylinder, to bring nitrogen oxides $NO_x$, hydrocarbon HC, and carbon monoxide CO, which are included in the exhaust gas, into contact with the three-way catalyst, to thereby reduce all components $NO_x$, HC, and CO simultaneously. Note that an air-fuel ratio of an air-fuel mixture in a combustion chamber of an internal combustion engine is referred to as an engine air-fuel ratio, hereinafter.

On the other hand, a low fuel consumption rate is desirable, and thus it is desirable to make the engine air-fuel ratio as lean as possible. However, if the engine air-fuel ratio is made to be lean with respect to the stoichiometric point, the above-mentioned exhaust gas purifying apparatus cannot reduce $NO_x$ sufficiently.

To solve this problem, Japanese unexamined patent publication No. 4-365920 discloses an exhaust gas purifying apparatus for an internal combustion engine with multi-cylinders, the engine having first and second cylinder groups. The purifying apparatus is provided with: an engine operation control device to continuously make each cylinder of the first cylinder group perform a rich engine operation in which the engine air-fuel ratio is set rich with respect to the stoichiometric point, and to continuously make each cylinder of the second cylinder group perform a lean engine operation, in which the engine air-fuel ratio is set lean with respect to the stoichiometric point; a first exhaust passage connected to each cylinder of the first cylinder group; a second exhaust passage connected to each cylinder of the second cylinder group and different from the first exhaust passage; an ammonia synthesizing catalyst arranged in the first exhaust passage for synthesizing ammonia $NH_3$ from $NO_x$ in the inflowing exhaust gas; an interconnecting passage interconnecting the first exhaust passage downstream of the $NH_3$ synthesizing catalyst and the second exhaust passage; and an exhaust gas purifying catalyst arranged in the interconnecting passage to react $NO_x$ and $NH_3$ flowing therein with each other to thereby reduce $NO_x$ and $NH_3$ simultaneously. In this exhaust gas purifying apparatus, the fuel consumption rate is reduced by increasing the number of the cylinders of the second cylinder group in which the lean engine operation is performed, while $NO_x$ is sufficiently reduced by introducing the exhaust gas from the first cylinder group in which the rich engine operation is performed to thereby synthesize $NH_3$, and by reacting this $NH_3$, and $NO_x$, from the second cylinder group at the exhaust gas purifying catalyst.

The exhaust gas purifying catalyst may be a catalyst having a zeolite carrying cobalt Co, copper Cu, Nickel Ni, or iron Fe. However, the inventors of the present application have found that such a catalyst sufficiently reduces $NO_x$ and $NH_3$ simultaneously only when the temperature of the exhaust gas entering therein is within a specific temperature range, which is referred to as a purifying temperature range hereinafter. In the actual engine operation, however, the inflowing exhaust gas temperature varies outside the purifying temperature range. When the inflowing exhaust gas temperature is out of the purifying temperature range, the above catalyst would not reduce $NO_x$ and $NH_3$ simultaneously sufficiently. An additional device to cool or heat the exhaust gas flowing into catalyst may keep the inflowing gas temperature within the purifying temperature range, but such an additional device may complicate the arrangement of the purifying apparatus, and may be costly.

SUMMARY OF THE INVENTION

An object of the present invention is to provide an exhaust gas purifying catalyst for reducing nitrogen oxides and ammonia in an exhaust gas sufficiently and simultaneously, with a wider purifying temperature range.

According to the present invention, there is provided an exhaust gas purifying catalyst for purifying an exhaust gas of an internal combustion engine, comprising a first catalyst having zeolite carrying platinum and copper thereon to remove nitrogen oxides and ammonia in the exhaust gas under an oxidizing atmosphere.

The present invention may be more fully understood from the description of preferred embodiments of the invention set forth below, together with the accompanying drawings.

DESCRIPTION OF THE PREFERRED EMBODIMENTS

In general, nitrogen oxides $NO_x$ include nitrogen monoxide NO, nitrogen dioxide $NO_2$, dinitrogen tetroxide $N_2O_4$, dinitrogen monoxide $NO_2O$, etc. The following explanation is made by considering $NO_x$ to mainly consist of nitrogen monoxide NO and/or nitrogen dioxide $NO_2$, but an exhaust gas purifying catalyst according to the present invention can reduce other nitrogen oxides.

First Embodiment

Figure 1:
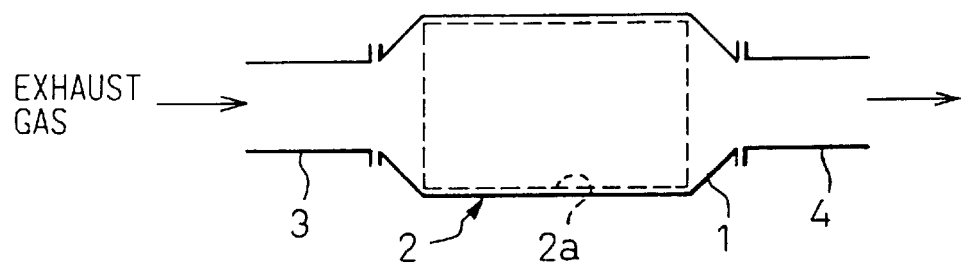
FIG. 1 shows an exhaust gas purifying catalyst according to a first embodiment of the present invention.

Referring to FIG. 1, the reference numeral 1 denotes a catalytic converter accommodating an exhaust gas purifying catalyst 2 according to the present invention therein. An inlet of the catalytic converter 1 is connected to an exhaust duct 3 and the duct 3 is connected to an internal combustion engine. An outlet of the catalytic converter 1 is connected to an exhaust duct 4.

In the embodiment shown in FIG. 1, the catalyst 2 comprises a zeolite 2a, as a carrier, carrying both platinum Pt and copper Cu after an ion-changing process, and it is referred as a Pt—Cu zeolite catalyst, hereinafter. The Pt—Cu zeolite catalyst 2a is carried on the surface of a substrate in the form of, for example, honeycomb. For zeolite, silica rich zeolite may be used, such as ZSM-5 zeolite, ferrierite, mordenite, etc. Note that the Pt—Cu zeolite catalyst 2a is carried substantially over the entire surface of the substrate.

The exhaust gas purifying catalyst 2 performs the reduction of $NO_x$ and the oxidation of $NH_3$, when the exhaust gas including $NO_x$ and $NH_3$ contacts the catalyst 2 in an oxidizing atmosphere. In this case, the exhaust gas including $NO_x$ and $NH_3$ may be an exhaust gas including $NO_x$ and $NH_3$ mixedly, or an exhaust gas having two parts, one including $NO_x$ without including $NH_3$, the other including $NH_3$ without including $NO_x$, and the two parts inflowing alternately repeatedly. Also, if the exhaust gas inflowing the exhaust gas purifying catalyst 2 includes both of $NO_x$ and $NH_3$, $NO_x$ oxidizes $NH_3$. The above purifying mechanism has not been made clear, but it can be considered that the purifying mechanism is performed according to the following reactions (1) to (4), that is:

$$4NH_3 + 7O_2 \rightarrow 4NO_2 + 6H_2O \quad (1)$$

$$4NH_3 + 5O_2 \rightarrow 4NO + 6H_2O \quad (2)$$

$$8NH_3 + 6NO_2 \rightarrow 12H_2O + 7N_2 \quad (3)$$

$$4NH_3 + 4NO + 6H_2O + 4N_2 \quad (4)$$

The reactions (3) and (4) which are denitration reactions, reduce both $NO_x$ produced in the oxidation reactions (1) and (2), and $NO_x$ flowing into the exhaust gas purifying catalyst 2. In this way, $NO_x$ and $NH_3$ are reduced simultaneously, at the catalyst 2.

Note that zeolite has an adsorbing and releasing function of $NH_3$ in which zeolite temporarily adsorbs $NH_3$ in the inflowing exhaust gas, and releases the adsorbed $NH_3$. The absorbing and releasing mechanism of $NH_3$ of zeolite is also unclear but it can be considered that zeolite adsorbs $NH_3$ when the inflowing exhaust gas includes $NH_3$, and releases the adsorbed $NH_3$ when the concentration of $NH_3$ in the inflowing exhaust gas becomes lower, or when the inflowing exhaust gas includes $NO_x$. The released $NH_3$ reacts with $NO_x$ included in the inflowing exhaust gas to thereby be reduced. Accordingly, if the exhaust gas part including $NO_x$ without including $NH_3$, and the exhaust gas part including $NH_3$ without including $NO_x$ contact with the exhaust gas purifying catalyst 2 alternately repeatedly, $NH_3$ in the inflowing exhaust gas is adsorbed in the catalyst 2 when the exhaust gas part including $NH_3$ without including $NO_x$ contacts with the catalyst 2, and $NH_3$ in the catalyst 2 is released when the exhaust gas part including $NO_x$ without including $NH_3$ contacts with the catalyst 2. The released $NH_3$ is resolved by the oxidation reactions (1) and (2) mentioned above, in an oxidizing atmosphere, and $NO_x$ in the inflowing exhaust gas is reduced by the denitration reactions (3) and (4) mentioned above.

On the other hand, the reduction of $NO_x$ and $NH_3$ can be observed when the exhaust gas including $NO_x$ and $NH_3$ contacts, in an oxidizing atmosphere, with a catalyst comprising a zeolite carrying copper Cu by the ion-changing process, which is referred to as the Cu zeolite catalyst, hereinafter. However, the inventors of the present invention has found that it is difficult for the Cu zeolite catalyst to reduce $NO_x$ and $NH_3$ sufficiently simultaneously when the temperature of the exhaust gas inflowing the Cu zeolite catalyst is relatively low, for example, at about 100 to 200° C. That is, the large amount of $NH_3$ is exhausted form the Cu zeolite catalyst without being reduced, although $NO_x$ can be reduced sufficiently. It is considered that this is because the oxidizing ability of copper Cu at the low temperature is relatively weak, and the oxidizing reactions (1) and (2) mentioned above do not occur sufficiently, and thereby $NH_3$ is not oxidized sufficiently.

In this embodiment, the exhaust gas purifying catalyst 2 is formed as the Pt—Cu zeolite catalyst 2a. Platinum Pt has an adequate oxidizing ability even at the low temperature, and thus $NH_3$ is sufficiently oxidized even when the temperature of the inflowing exhaust gas is relatively low. Accordingly, $NO_x$ and $NH_3$ are reduced simultaneously and sufficiently.

Note that the inventors of the present invention have found that an exhaust gas purifying catalyst 2 consisting of the Pt—Cu zeolite catalyst 2a resolves $NH_3$ sufficiently at a wider temperature range of the inflowing exhaust gas, for example, about 100 to 500° C., when contacting the exhaust gas including $NH_3$ without including $NO_x$ therewith.

Second Embodiment

Figure 2:
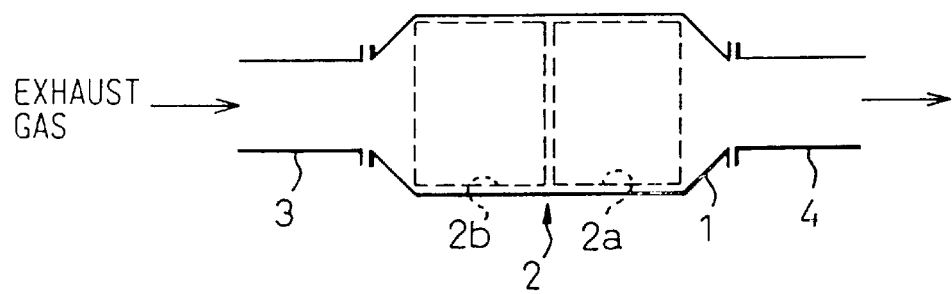
FIG. 2 shows an exhaust gas purifying catalyst according to a second embodiment of the present invention.

FIG. 2 shows another embodiment of the exhaust gas purifying catalyst 2 according to the present invention. In FIG. 2, constituent elements the same as those in FIG. 1 are given the same reference numerals.

In the embodiment shown in FIG. 2, the exhaust gas purifying catalyst 2 comprises the Pt—Cu zeolite catalyst 2a and the Cu zeolite catalyst 2b. Further, in this embodiment, the Pt—Cu zeolite catalyst 2a and the cu zeolite catalyst 2b are carried on the surface of the common substrate. Namely, the Pt—Cu zeolite catalyst 2a as in the embodiment shown in FIG. 1 is carried on the surface of a downstream portion of the substrate with respect to the exhaust gas flow, and the Cu zeolite catalyst 2b is carried on the surface of an upstream portion of the substrate. Note that the Cu zeolite catalyst 2b is formed of a silica rich zeolite carrying copper Cu after an ion-changing process.

The exhaust gas purifying catalyst 2 according to this embodiment also reduces $NO_x$ and $NH_3$ in the exhaust gas simultaneously and sufficiently when contacting the exhaust gas including $NO_x$ and $NH_3$, in an oxidizing atmosphere. In this embodiment, it is considered that the exhaust gas purification based on the purifying mechanism explained by the above mentioned reactions (1) to (4) is performed at each of the Pt—Cu zeolite catalyst 2a and the Cu zeolite catalyst 2b, or over all of the exhaust gas purifying catalyst 2.

As mentioned above, if the exhaust gas purifying catalyst 2 is formed as the Pt—Cu zeolite catalyst 2a, the exhaust gas purifying catalyst 2 reduces $NO_x$ and $NH_3$ in the inflowing exhaust gas simultaneously and sufficiently at the low exhaust gas temperature. However, the inventors of the present invention have found that $NO_x$ is exhausted from the exhaust gas purifying catalyst 2, without being reduced, when the temperature of the inflowing exhaust gas becomes higher, for example, above about 200° C. It is considered that this is because, when the temperature of the inflowing exhaust gas becomes higher, the oxidizing ability of platinum Pt becomes too strong, and a very large amount of $NO_x$ is synthesized by the oxidizing reactions (1) and (2) mentioned above, and thus it becomes difficult for the denitration reactions (3) and (4) mentioned above to reduce $NO_x$ sufficiently.

In this embodiment, the exhaust gas purifying catalyst 2 comprises Pt—Cu zeolite catalyst 2a and Cu zeolite catalyst 2b to thereby reduce $NO_x$ and $NH_3$ simultaneously and sufficiently at the wider temperature range of the inflowing exhaust gas, that is, for example, about 100 to 500° C. It is considered that this is because the Cu zeolite catalyst 2b, which is arranged upstream of the Pt—Cu zeolite catalyst 2a with respect to the exhaust gas flow, makes the amount of $NO_x$ flowing into Pt—Cu zeolite catalyst 2a very small or substantially zero. That is, the Pt—Cu zeolite catalyst 2a has a good characteristic for reducing (removing) $NH_3$ when inflowing the exhaust gas including $NH_3$ without including $NO_x$ as mentioned above, and thus the exhaust gas purifying catalyst 2 has a good exhaust gas purifying characteristic, as a whole.

Referring to FIG. 2 again, the Pt—Cu zeolite catalyst 2a is arranged in the downstream side with respect to the exhaust gas flow, and the Cu zeolite catalyst 2b is arranged in the upstream side. Alternatively, the Pt—Cu zeolite catalyst 2a may be arranged in the upstream side, and the Cu zeolite catalyst 2b may be arranged in the downstream side. However, it is desired that the Pt—Cu zeolite catalyst 2a is arranged in the downstream side, and the Cu zeolite catalyst 2b is arranged in the upstream side, as shown in FIG. 2. It has been found that the endurance temperature and the working temperature of the Pt—Cu zeolite catalyst 2a are lower than those of the Cu zeolite catalyst 2b respectively. And, generally, the temperature of the exhaust gas at the downstream side is lower than that at the upstream side. Therefore, arranging the Pt—Cu zeolite catalyst 2a in the downstream side and the Cu zeolite catalyst 2b in the upstream side ensures the sufficient purification of the exhaust gas, while preventing these catalysts 2a and 2b from remarkably deteriorating.

Further, as mentioned above, the Pt—Cu zeolite catalyst 2a can reduce $NH_3$ in the exhaust gas including $NH_3$ without including $NO_x$ over the wide temperature range of the inflowing exhaust gas. Thus, by arranging the Pt—Cu zeolite catalyst 2a in the downstream side and the Cu zeolite catalyst 2b in the upstream side, $NO_x$ and $NH_3$ are sufficiently reduced in the Pt—Cu zeolite catalyst 2a, even when the temperature of the inflowing exhaust gas is low and thereby $NO_x$ and $NH_3$ are insufficiently reduced in the Cu zeolite catalyst 2b.

Further, even when $NH_3$ passes through the Cu zeolite catalyst 2b without being reduced by greatly increasing the $NH_3$ amount flowing into the exhaust gas purifying catalyst 2 or the $NH_3$ amount exhausted from the Cu zeolite catalyst 2b, $NH_3$ exhausted from the Cu zeolite catalyst 2b is sufficiently reduced in the Pt—Cu zeolite catalyst 2a, because the Pt—Cu zeolite catalyst 2a has good purifying characteristic for reducing (removing) $NH_3$. Namely, the Pt—Cu zeolite catalyst 2a sufficiently reduces $NH_3$ exhausted from the Cu zeolite catalyst 2b, even when the concentration of $NH_3$ in the exhaust gas exhausted from the Cu zeolite catalyst 2b is high. Accordingly, the amount of $NO_x$ and $NH_3$ exhausted from the exhaust gas purifying catalyst 2 without being reduced is extremely reduced.

Third Embodiment

Figure 3:
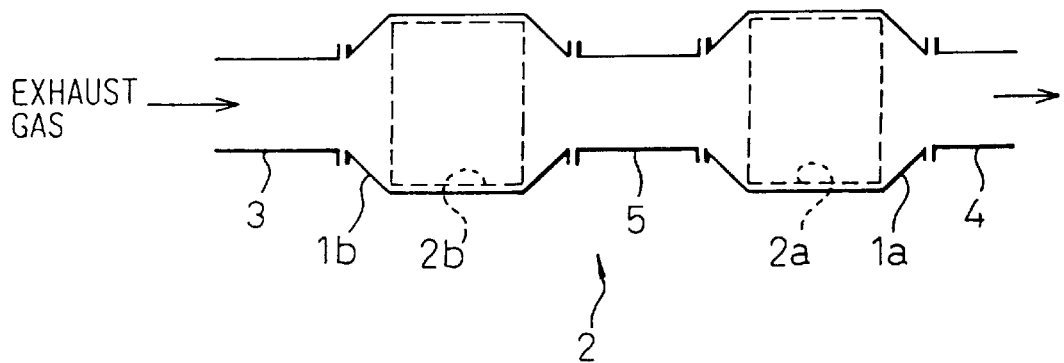
FIG. 3 shows an exhaust gas purifying catalyst according to a third embodiment of the present invention.

FIG. 3 shows the further another embodiment of the exhaust gas purifying catalyst 2 according to the present invention. Also, in this embodiment, the exhaust gas purifying catalyst 2 comprises both the Pt—Cu zeolite catalyst 2a and the Cu zeolite catalyst 2b. However, the catalysts 2a and 2b are carried on respective carriers different from each other. That is, the Pt—Cu zeolite catalyst 2a is housed in the catalytic converter 1a arranged on the downstream side, with respect to the exhaust gas flow, and connected to the duct 4, and the Cu zeolite catalyst 2b is housed in the catalytic converter 1b arranged on the upstream side and connected to the duct 3. The catalytic converters 1a and 1b are connected to each other via a duct 5.

The exhaust gas purifying catalyst 2 in this embodiment also reduces $NO_x$ and $NH_3$ sufficiently simultaneously. Further, the Pt—Cu zeolite catalyst 2a may be on the upstream side and the Cu zeolite catalyst 2b may be on the downstream side, while it is desirable that the Pt—Cu zeolite catalyst 2a is on the downstream side and the Cu zeolite catalyst 2b is on the upstream side.

Fourth Embodiment

Figure 4:
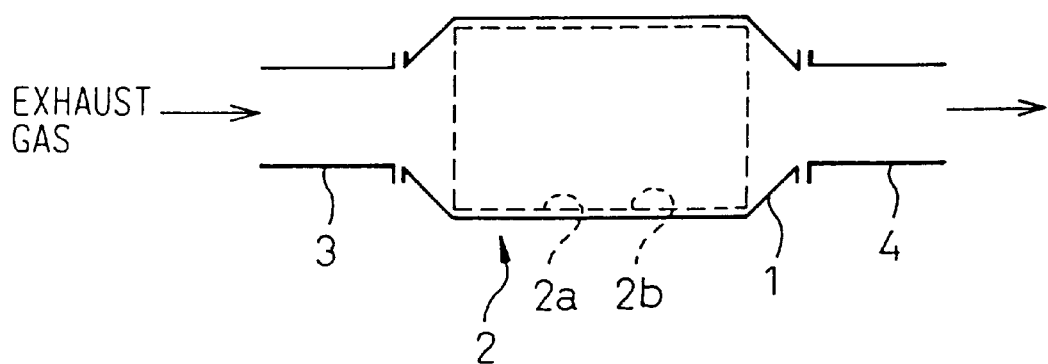
FIG. 4 shows an exhaust gas purifying catalyst according to a fourth embodiment of the present invention.

FIG. 4 shows still further another embodiment of the exhaust gas purifying catalyst 2 according to the present invention. Also, in this embodiment, the exhaust gas purifying catalyst 2 comprises both the Pt—Cu zeolite catalyst 2a and the Cu zeolite catalyst 2b. However, the catalysts 2a and 2b are not arranged in series, but are carried on the common carrier and are laminated thereon to each other. In this case, any laminating order of the catalysts 2a and 2b are acceptable, but it is desirable that the Pt—Cu zeolite catalyst 2a is first carried on the substrate and then the Cu zeolite catalyst 2b is carried thereon to thereby coat the Pt—Cu zeolite catalyst 2a, considering the endurance temperature of the catalysts 2a and 2b. Additionally, the Pt—Cu zeolite catalyst 2a and the Cu zeolite catalyst 2b may be carried on the substrate substantially uniformly.

Figure 5:
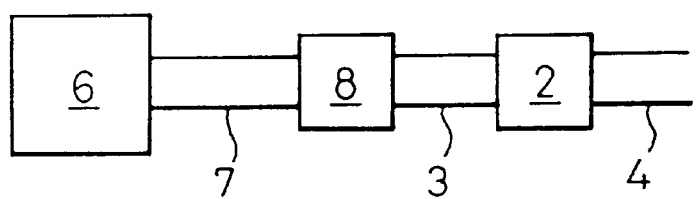
FIG. 5 is a general view of an internal combustion engine provided with an exhaust gas purifying catalyst according to the present invention.

FIG. 5 shows the exhaust gas purifying catalyst 2 of the present invention shown in, for example, FIG. 2, applied to an internal combustion engine. Referring to FIG. 5, the engine 6 is connected to a three-way catalyst 8 as an $NH_3$ synthesizing catalyst via a duct 7, and the three-way catalyst 8 is connected to the exhaust gas purifying catalyst 2 via the duct 3. The engine 6 may be an engine for an automobile.

In the engine 6, the rich engine operation and the lean engine operation are performed alternately and repeatedly. When the exhaust gas exhausted from the engine 6 during the rich engine operation thereof reaches the three-way catalyst 8, the catalyst 8 converts some of the $NO_x$ in the exhaust gas to $NH_3$, and reduces the remaining $NO_x$ to $N_2$. $NH_3$ synthesized in the three-way catalyst 8 then flows into the exhaust gas purifying catalyst 2 and is adsorbed therein. Thus, both $NO_x$ and $NH_3$ are prevented from being exhausted from the exhaust gas purifying catalyst 2.

On the other hand, the exhaust gas exhausted from the engine 6 during the lean engine operation reaches the three-way catalyst 8, $NO_x$ in the exhaust gas passes through the catalyst 8 without any oxidation or reduction reactions, and then flows into the exhaust gas catalyst 2. The $NH_3$ concentration in the exhaust gas at this time is substantially zero, and thus $NH_3$ adsorbed in the exhaust gas purifying catalyst 2 is released. At this time, the exhaust gas purifying catalyst 2 is in an oxidizing atmosphere, and thus the released $NH_3$ together with $NO_x$ in the inflowing exhaust gas is reduced on the exhaust gas purifying catalyst 2. Accordingly, $NO_x$ and $NH_3$ are prevented from being exhausted, from the exhaust gas purifying catalyst 2, when the engine 6 performs the rich engine operation and when the engine 6 performs the lean engine operation. Note that the engine 6 may be operated with the stoichiometric air-fuel ratio, in, for example, acceleration.

EXAMPLE 1

The exhaust gas purifying catalyst 2 was prepared to be composed of the Pt—Cu zeolite catalyst 2a carrying 1 wt % platinum Pt and 2.4 wt % copper Cu on the ZSM-5 type zeolite having $SiO_2/Al_2O_3$ (mole ratio) of 40, by an ion-changing process (see FIG. 1).

EXAMPLE 2

The exhaust gas purifying catalyst 2 was prepared to be composed of the Pt—Cu zeolite catalyst 2a as in example 1, and the Cu zeolite catalyst 2b carrying 2.4 wt % copper Cu on the ZSM-5 type zeolite having SiO$_2$/Al$_2$O$_3$ (mole ratio) of 40, by an ion-changing process, the Pt—Cu zeolite catalyst 2a being arranged on the downstream portion, with respect to the gas flow, of the exhaust gas purifying catalyst 2, and the Cu zeolite catalyst 2b being arranged on the upstream portion of the exhaust gas purifying catalyst 2 (see FIG. 2).

Comparative Example

The exhaust gas purifying catalyst was prepared to be composed of the Cu zeolite catalyst 2b as in the example 2.

Test 1

A model gas simulating the exhaust gas having the following composition was prepared and contacted to the exhaust gas purifying catalysts of the examples 1 and 2 and the comparative example, respectively. The conversion ratio of both of NO$_x$ and NH$_3$ was measured at the outlet of the exhaust gas purifying catalyst, at various temperatures of the inflowing gas:

| | |
|---|---|
| NH$_3$: | 100 (ppm) |
| NO$_x$: | 100 (ppm) |
| CO$_2$: | 15(%) |
| O$_2$: | 4(%) |
| H$_2$O: | 3(%) |
| N$_2$: | balance |

Figure 6:
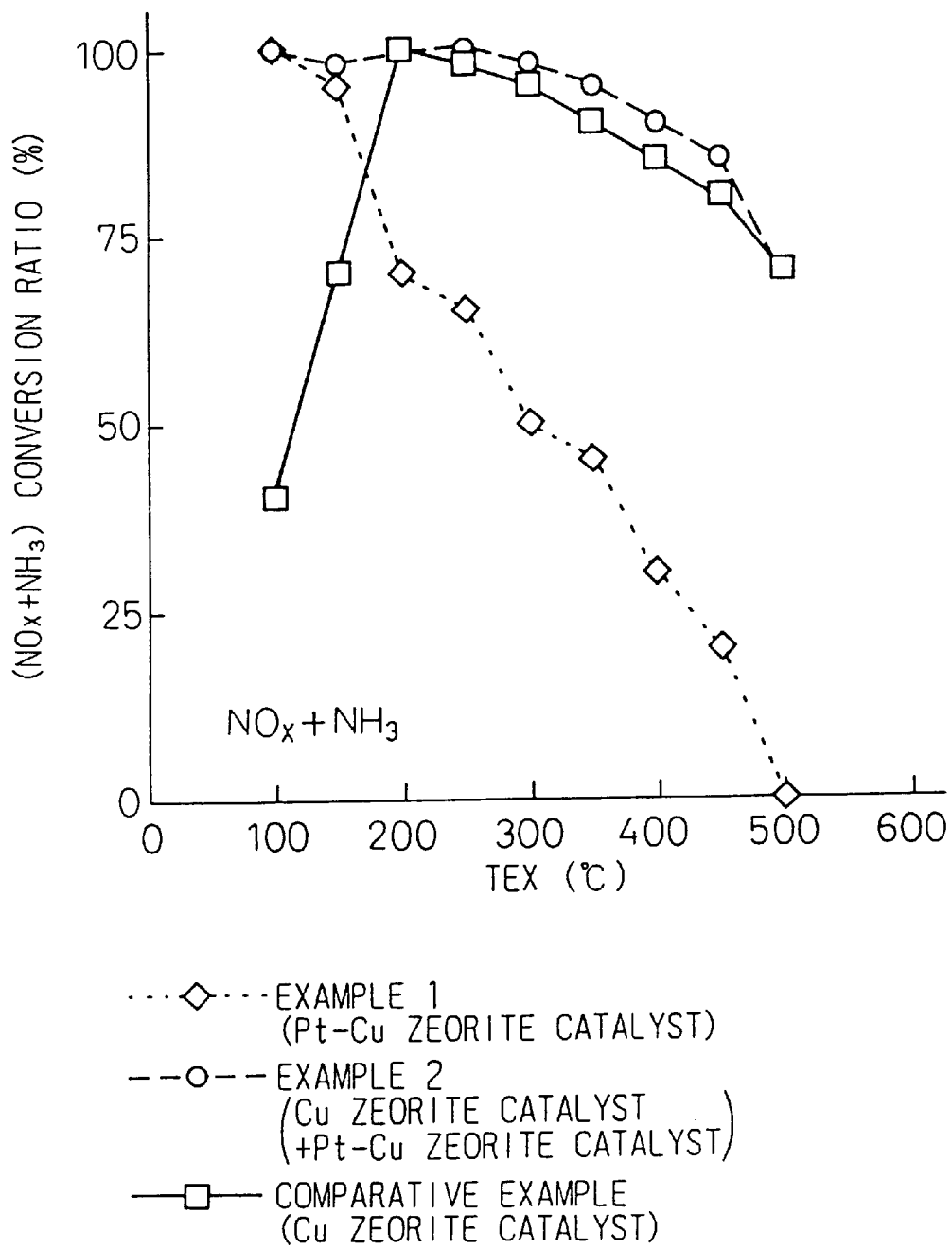
FIG. 6 is a diagram representing experimental results of an $NO_x$ and $NH_3$ conversion ratio.

The experimental results are shown in FIG. 6. FIG. 6 shows that the conversion ratio of NO$_x$ and NH$_3$ is maintained above 80%: when the inflowing gas temperature is within the range of about 100 to 180° C., with the example 1; when the inflowing gas temperature is within the range of about 100 to 470° C., with the example 2; and when the inflowing gas temperature is within the range of about 160 to 450° C., with the comparative example. Further, FIG. 6 shows that the conversion ratio of NO$_x$ and NH$_3$ is maintained above 90%: when the inflowing gas temperature is within the range of about 100 to 160° C., with the example 1; when the inflowing gas temperature is within the range of about 100 to 400° C., with the example 2; and when the inflowing gas temperature is within the range of about 180 to 350° C., with the comparative example. Accordingly, it can be found that, when the inflowing gas temperature is low, the exhaust gas catalyst of the example 1 reduces NO$_x$ and NH$_3$ simultaneously more sufficient than the comparative example. Additionally, the exhaust gas catalyst of the example 2 reduces NO$_x$ and NH$_3$ simultaneously more sufficient than the comparative example, over the wider range of the inflowing gas temperature.

Test 2

A model gas simulating the exhaust gas having the following composition was prepared and contacted to the exhaust gas purifying catalysts of the examples 1 and 2 and the comparative example, respectively. The conversion ratio of NH$_3$ was measured at the outlet of the exhaust gas purifying catalyst, at various temperature of the inflowing gas:

| | |
|---|---|
| NH$_3$: | 100 (ppm) |
| CO$_2$: | 15(%) |
| O$_2$: | 4(%) |
| H$_2$O: | 3(%) |
| N$_2$: | balance |

Figure 7:
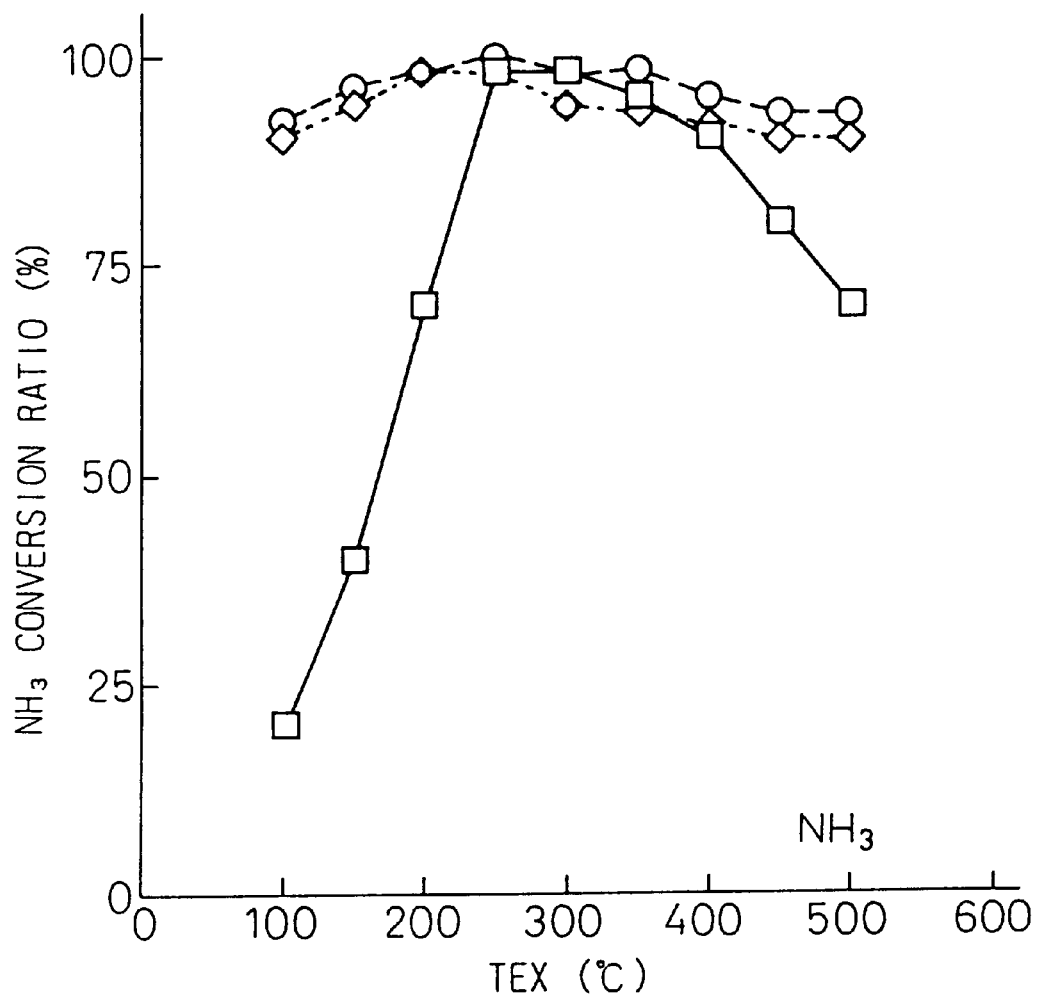
FIG. 7 is a diagram representing experimental results of an $NO_x$ conversion ratio.

The experimental results are shown in FIG. 7. FIG. 7 shows that the conversion ratio of NH$_3$ is maintained above 80%: when the inflowing gas temperature is within the range of about 100 to 500° C., with the example 1; when the inflowing gas temperature is within the range of about 100 to 500° C., with the example 2; and when the inflowing gas temperature is within the range of about 220 to 450° C., with the comparative example. Further, FIG. 7 shows that the conversion ratio of NH$_3$ is maintained above 90%: when the inflowing gas temperature is within the range of about 100 to 500° C., with the example 1; when the inflowing gas temperature is within the range of about 100 to 500° C., with the example 2; and when the inflowing gas temperature is within the range of about 240 to 400° C., with the comparative example. Accordingly, it can be seen that the exhaust gas catalyst of the examples 1 and 2 reduce NH$_3$ more sufficient than the comparative example, over the wider range of the inflowing gas temperature.

According to the present invention, it is possible to provide an exhaust gas purifying catalyst for reducing nitrogen oxides and ammonia in an exhaust gas sufficiently simultaneously, with a wider purifying temperature range.

While the invention has been described by reference to specific embodiments chosen for purposes of illustration, it should be apparent that numerous modifications could be made thereto by those skilled in the art without departing from the basic concept and scope of the invention.

What is claimed is:

1. A catalyst for purifying an exhaust gas of an internal combustion engine, the catalyst comprising a first catalyst for removing in an oxidizing atmosphere nitrogen oxide and ammonia included in the exhaust gas, the first catalyst having zeolite carrying platinum and copper thereon, the catalyst further comprising a second catalyst having zeolite carrying copper thereon, wherein the first and second catalysts are arranged in series along a flow direction of the exhaust gas with a downstream end of an upstream one of the first and second catalysts being located upstream of an upstream end of the downstream one of the first and second catalysts.

2. An exhaust gas purifying catalyst according to claim 1, wherein the first catalyst is arranged downstream of the second catalyst along the flow direction of the exhaust gas.

3. An exhaust gas purifying catalyst according to claim 1, wherein the first and second catalysts are carried on a common substrate.

4. An exhaust gas purifying catalyst according to claim 1, wherein each of the first and second catalysts is carried on an individual substrate.

5. An exhaust gas purifying catalyst according to claim 1, wherein said zeolite includes silica.

* * * * *

UNITED STATES PATENT AND TRADEMARK OFFICE
CERTIFICATE OF CORRECTION

PATENT NO. : 6,133,185
DATED : 17 October 2000
INVENTOR(S) : Yukio KINUGASA et al.

It is certified that error appears in the above-identified patent and that said Letters Patent is hereby corrected as shown below:

| Column | Line | |
|---|---|---|
| 2 | 50 | Change "NO$_2$O" to --N$_2$O--. |
| 6 | 30 | Change "6during" to --6 during--. |
| 6 | 39 | Change "6during" to --6 during--. |

Signed and Sealed this

Fifteenth Day of May, 2001

Attest:

NICHOLAS P. GODICI

Attesting Officer        Acting Director of the United States Patent and Trademark Office